April 17, 1934.  M. GRAF  1,955,542
AUTOMATICALLY SECURED BELT AND STRAP TIGHTENER
Filed Jan. 9, 1932
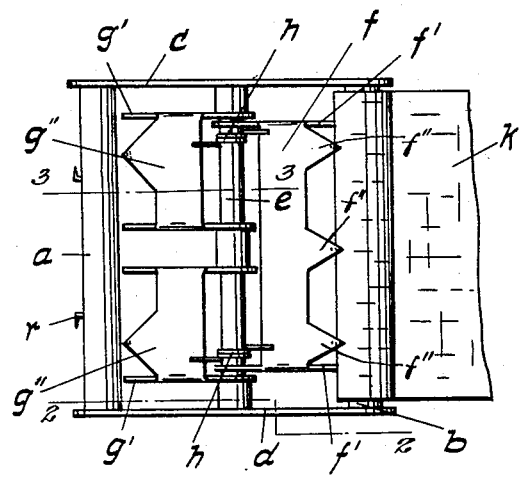
Fig. 1
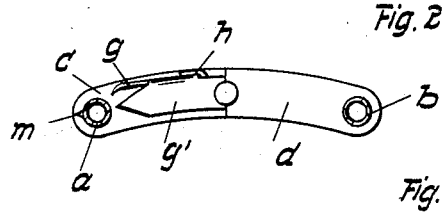
Fig. 2
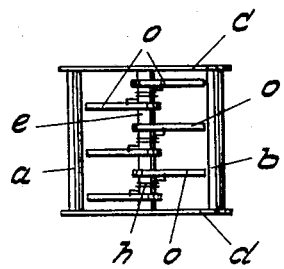
Fig. 5.
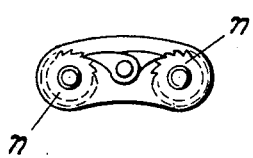
Fig. 4
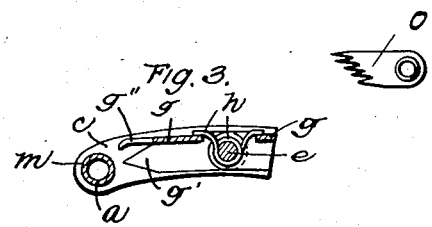
Fig. 3.
Fig. 6.
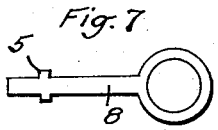
Fig. 7

Patented Apr. 17, 1934

1,955,542

UNITED STATES PATENT OFFICE 1,955,542

AUTOMATICALLY SECURED BELT AND STRAP TIGHTENER

Martin Graf, Konigslutter, near Brunswick, Germany

Application January 9, 1932, Serial No. 585,746
In Germany June 27, 1930

5 Claims. (Cl. 24—32)

The invention applies to a belt fastener for bucket elevators or similar material handling devices, simultaneously automatically tightening and securing the belt. Similar belt fasteners known up till now are imperfect. The tightening of such belts can only be done in a most complicated manner, requiring much time. Belt tighteners avoiding such drawbacks are certainly known, but the process of tightening cannot be done in the simplest and automatic manner.

The essential features of the present invention are means acting direct upon the belt ends wound upon the rollers or upon the rollers themselves, to prevent the latter from turning backwards. The belt ends, which must butt against each other when laid upon the belt fastener, are fastened upon the rollers and then tightened up by turning the latter by means of a wrench applied at the end. Toothed plates penetrating into the belt prevent the rollers from turning backwards. One particular advantage of the invention is, that even the shortest length of belt or a longer one wound several times around the roller is reliably held upon the latter. All fasteners known up till now act only in a perfect manner in case the belt ends have been wound at least one complete turn around the rollers. Summarizing, it may be said that the fastener according to the present invention enables a reliable tightening of the belt in quite a short time and in a perfect and simple manner. The rollers can also be provided with ratchet pinions with which ratchet pawls, hinged on at the sides, engage and hold the rollers by means of the pinions. In this case, the toothed plates can be done away with.

In the drawing, examples of various manners of execution of the present invention are shown.

Figure 1 is a top plan view of the self-securing belt fastener,

Figure 2 shows the belt fastener, partly in side elevation and partly in section on line 2—2 of Figure 1, Figure 3 is a part section on the construction shown in Figure 2, taken on line 3—3 of Figure 1, Figure 4 is an end elevational view of another form of belt fastener with ratchet pinions on the roller ends and pawls arranged between, with lateral plate omitted, Figure 5 is a top plan view of another form of belt fastener with individual toothed elements, independent of one another and pressing upon the belt ends, Figure 6 is a side elevation of a toothed element according to Figure 4; and Figure 7 shows the wrench for turning the rollers.

Two rollers $a$ and $b$ are rotatably held in the lateral parts $c$ and $d$. Upon an axle $e$, arranged between the rollers $a$ and $b$, toothed plates $f$ and $g$ are rotatably arranged, independently of each other. The teeth $f'$, $g'$ are arranged perpendicularly and the teeth $f''$ and $g''$ tangentially to the rollers $a$, $b$. A spring $h$ upon each of the plates $f$ and $g$ presses the latter against the belt ends wound upon the rollers $a$ and $b$. Securing devices in the shape of points $m$ or hooks $r$ are provided upon the rollers for the belt ends $k$.

In the form of construction according to Fig. 4 each of the rollers $a$, $b$ is rigidly connected to a ratchet pinion $n$ at each end adjacent the lateral plates $c$, $d$, in which ratchet wheels pawls $l$ mounted on the lateral plates $c$, $d$ at $p$ engage and prevent the rollers $a$, $b$ from turning backwards. In this form of construction the plates $f$, $g$ and the shaft $e$ may be omitted. In their stead the pawls $l$ mounted at $p$ on the lateral plates $c$, $d$ are provided and which engage in the ratchet pinions $n$ mounted on the rollers $a$, $b$. Consequently the rollers $a$, $b$ come closer together than in the form of construction according to Fig. 1. The rollers $a$ and $b$ are turned by means of a suitable wrench $q$ provided with claws or projections 5 which engage with the grooves $i$ in the ends of the rollers $a$ and $b$, shown on the right of Fig. 2. Small hooks $r$ or points $m$ can be arranged upon the rollers for holding the belt $k$. In place of these, the belt ends $k$ can also be fastened with screws, etc. upon the rollers $a$ and $b$.

The belt tightener acts as follows:—The toothed plates $f$ and $g$ have always the tendency to penetrate into the belt ends $k$ wound upon the rollers $a$ and $b$, thus at each re-tightening by turning the rolers $a$ and $b$, there will be an automatic locking or securing against turning backwards. When tightening the belt ends of the rollers provided with the securing pinions $n$, the pawls, pressed by springs, etc. into the toothing of the ratchet pinions $n$, will hold the rollers in position after the wrench has been removed.

In Fig. 1, the toothed plate $g$ is made in two parts. When the fastener is tightened by means of the wrench $q$ the teeth $f'$, $g'$ first grip the ends of the belt $k$ and then pull the remaining teeth $f''$, $g''$ of the plates $f$, $g$ within the range of the ends of the belt $k$. When the belt fastener is tightened up by means of the wrench described, these teeth will first catch into the belt ends to be tightened up and drag the other teeth into reach of the belt ends.

Fig. 5 is one method of making the belt fastener with several plates *o,* arranged vertically next to one another upon the axle *e* and provided with stages toothing as shown in Fig. 6.

What I claim to be new is set out hereunder:

1. A belt or strap tightener, comprising in combination two lateral bearing plates, rollers mounted in said bearing plates adapted to carry the belt ends, a shaft journalled in said bearing plates between said rollers, toothed bars oscillatably mounted on said shaft independently of one another, springs on said shaft adapted to press said bars against the belt ends on said rollers to tightly hold said belt ends irrespective of the position of said rollers.

2. A belt or strap tightener, comprising in combination two lateral bearing plates, rollers mounted in said bearing plates adapted to carry the belt ends, a shaft journalled in said bearing plates between said rollers, teeth oscillatably mounted on said shaft independently of one another, springs on said shaft adapted to press said teeth against the belt ends on said rollers and tightly hold said belt ends irrespective of the position of said rollers.

3. A tightener as specified in claim 1, comprising in combination with the toothed bars, lateral stop teeth on said bars adapted to engage the belt to be tightened before the engagement of the teeth of the bars.

4. A tightener as specified in claim 1 in which one of the bars is composed of several parts.

5. A belt or strap tightener, comprising in combination two lateral bearing plates, rollers mounted in said bearing plates adapted to carry the belt ends, means on said rollers to fasten the belt ends, means to lock said rollers in the position tightening said belt, and springs to press said locking means against the rollers.

MARTIN GRAF.